United States Patent

[11] 3,536,172

| [72] | Inventor | Thomas E. Frechette<br>Windsor Locks, Connecticut |
|---|---|---|
| [21] | Appl. No. | 732,732 |
| [22] | Filed | May 28, 1968 |
| [45] | Patented | Oct. 27, 1970 |
| [73] | Assignee | Litton Business Systems, Inc.<br>New York, New York<br>a corporation of New York |

[54] POWER PACK EMPLOYING A SINGLE CLUTCH TO DERIVE ANY ONE OF A NUMBER OF POWER OUTPUTS FROM THE SAME POWER SOURCE
8 Claims, 8 Drawing Figs.

[52] U.S. Cl. .................................................. 192/26,
192/33, 192/81, 192/83; 197/16
[51] Int. Cl. .................................................. F16d 11/06
[50] Field of Search .......................................... 192/26, 33;
197/16, 17, 98(Inquired)

[56] References Cited
UNITED STATES PATENTS

| 1,397,401 | 11/1921 | Butterworth et al. ......... | 192/33 |
| 1,765,527 | 6/1930 | Gollnick et al. ............. | 192/33X |
| 2,902,124 | 9/1959 | Capellaro ..................... | 192/33 |
| 3,077,971 | 2/1963 | Palmer ........................ | 197/16 |
| 3,239,040 | 3/1966 | Schneider..................... | 192/33X |
| 3,376,963 | 4/1968 | Schaefer ...................... | 192/26X |

*Primary Examiner*—Benjamin W. Wyche III
*Attorney*—Joseph R. Spalla and Cornelius P. Quinn

ABSTRACT: A power pack having a clutch adapted to couple to a power source a shaft having a plurality of motion output cams rigidly mounted thereon, each of the cams having a cam follower associated with it which is selectively movable from an inoperative position to an operative position in which it is capable to receive a cam actuated movement through a cyclic rotation of said shaft.

INVENTOR
THOMAS E. FRECHETTE

BY Cornelius P. Quinn
ATTORNEY

Patented Oct. 27, 1970
3,536,172
Sheet 2 of 3
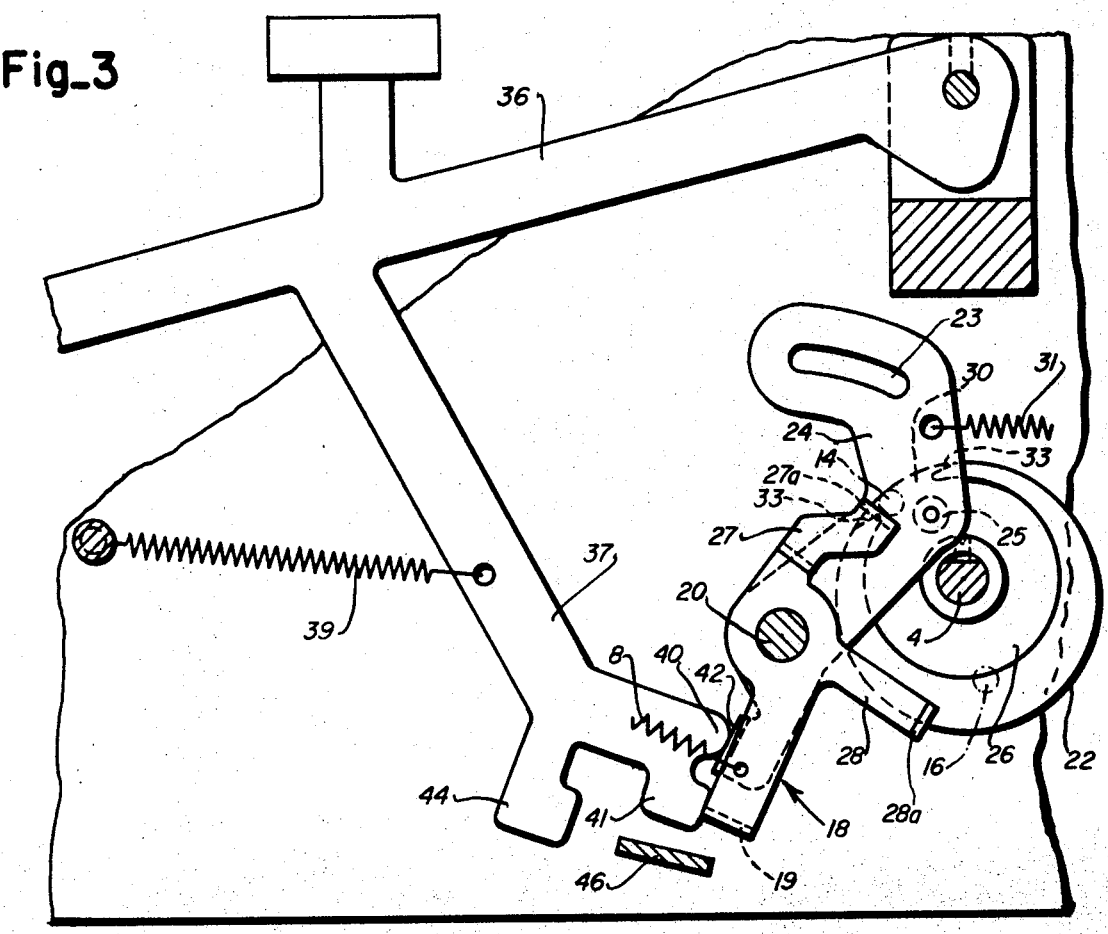
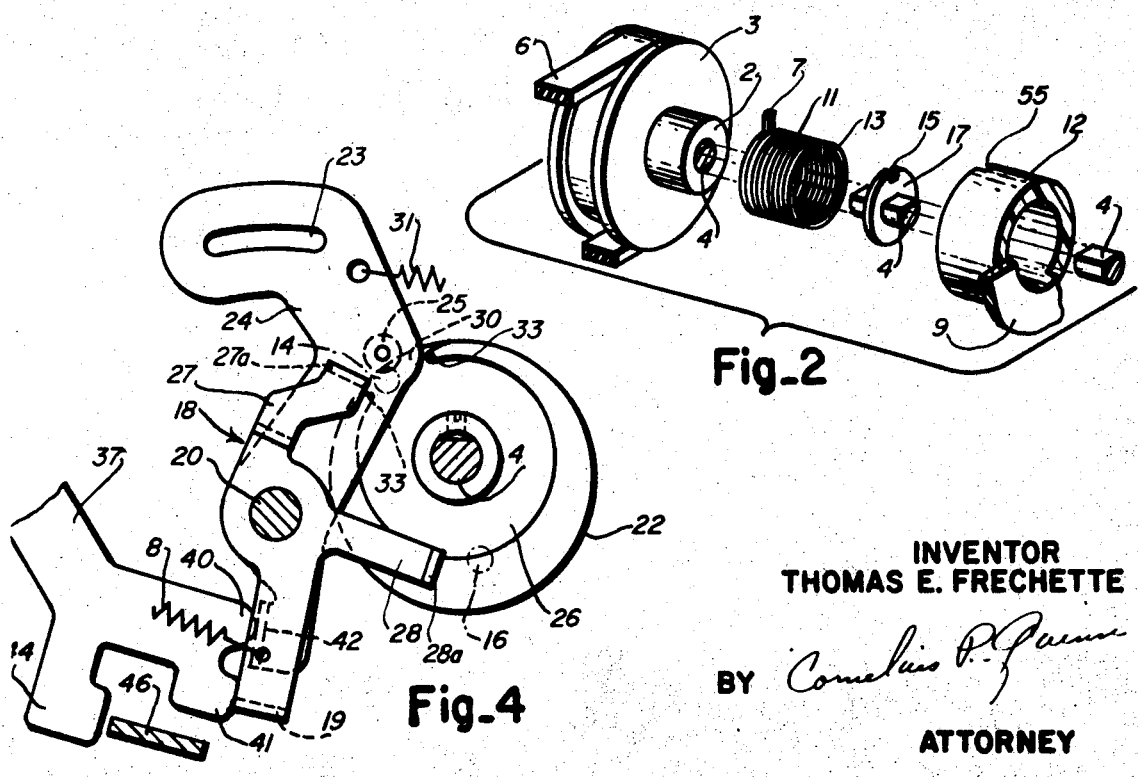
INVENTOR
THOMAS E. FRECHETTE
BY Cornelius P. Quinn
ATTORNEY

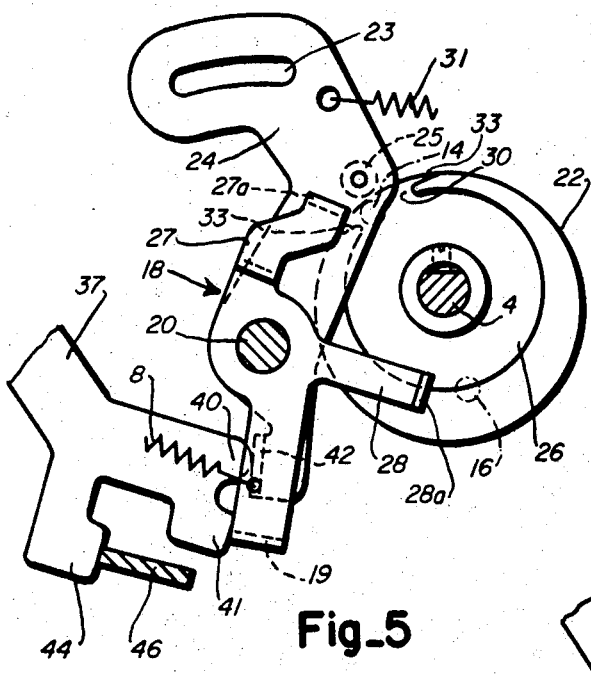
Fig_5
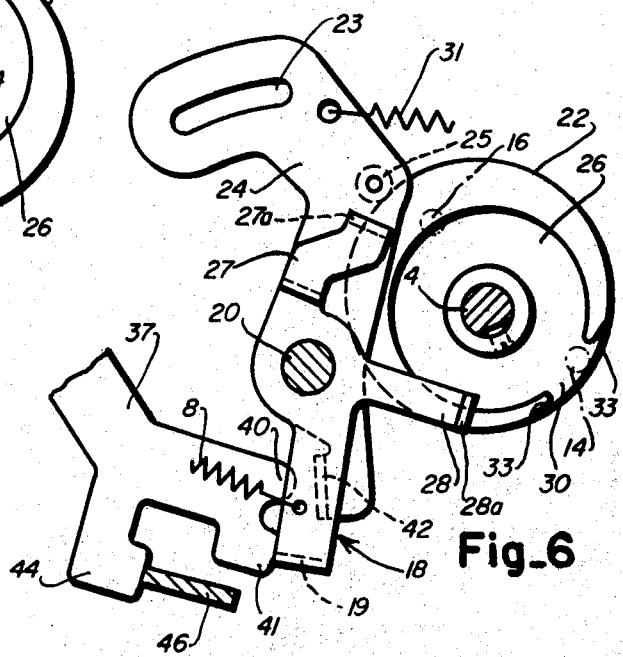
Fig_6
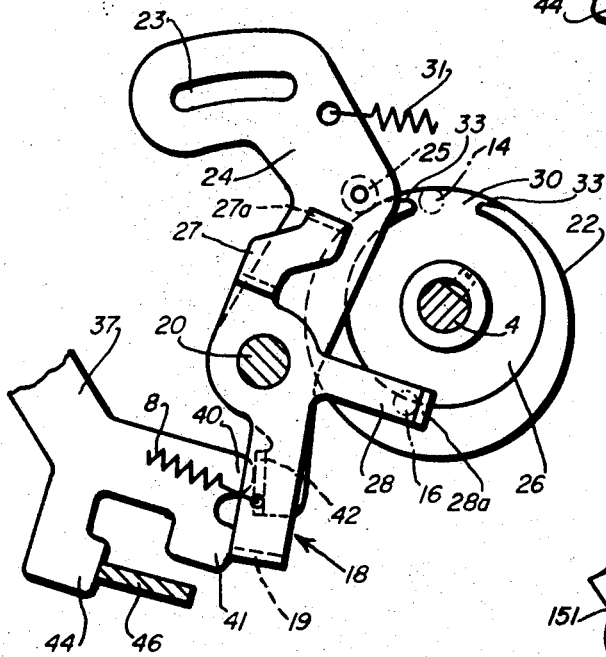
Fig_7
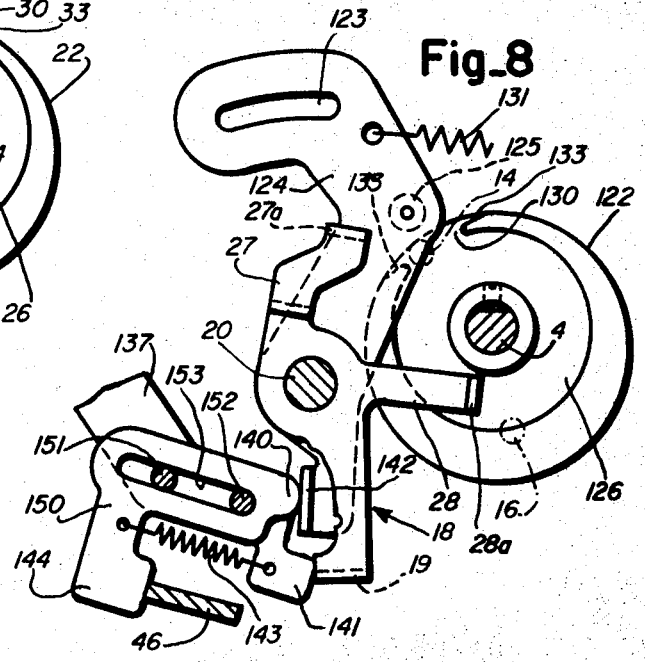
Fig_8

3,536,172

POWER PACK EMPLOYING A SINGLE CLUTCH TO DERIVE ANY ONE OF A NUMBER OF POWER OUTPUTS FROM THE SAME POWER SOURCE

BACKGROUND OF THE INVENTION

This invention relates to a power pack or drive mechanism and more particularly to a power pack in which any one of a number of individual power output functions may be selectively derived from individual cams which are cyclically operable together.

In Krauss et al. U. S. Pat. No. 3,268,069, dated Aug. 23, 1966, various function trains are selectable by keys individually related thereto to become power operated by a single cam which incidental to operation of any of said keys executes a cyclic operating turn.

Prior to the present invention, in order to selectively obtain any one of a number of cam actuated power outputs from a power source it was necessary to employ a drive mechanism or power pack having a separate clutch for each required power output and thereby to provide for motion output of tailored characteristics for different functions.

A significant disadvantage of such prior drive mechanisms or power packs is encountered in applications where space limitations are critical, for instance in typewriters, where the vertical dimension of the power pack is of particular concern. In order to minimize the vertical dimensions of the power pack, individual wrap spring clutches are utilized to couple the drive shaft connected to the power source to different output elements for such service functions as tab, backspace, carriage return, backspace and shift.

The cumulative effect of the wrap spring clutches understandably results in an appreciable amount of drag being imposed upon the drive shaft requiring a power source, an electric motor in this case, having a sufficient starting torque to overcome this drag.

Since the size and cost of an electric motor normally increases in direct relation to an increase in starting torque requirements, various means have been proposed previously to relieve the electric motor, from the full effects of the starting torque requirements necessary to overcome the drag of the wrap spring clutches. For example, auxiliary or "hot" high starting torque windings have been used for starting the motor or centrifugal clutches, and wrap spring clutches have been employed to allow the electric motor to come up to operating speed and thus to generate sufficient torque to drive the power shaft.

Unfortunately, however, any savings in space and/or cost of the motor achieved by reducing the starting torque requirements of the motor in these prior proposals have been largely offset by the cost and the space consumed by the mechanisms employed to effect this goal.

SUMMARY

In the present invention a power pack is provided by which any one of a number of power output functions may be selectively obtained from a single power-cycled shaft. A single clutch when actuated is adapted to couple a power source to cycle a shaft which has a number of cams rigidly mounted thereon. Each of the cams has associated with it a cam follower selectively movable, substantially simultaneously with clutch actuation, from an inoperative to an operative position in which it provides a desired power output function.

Accordingly, a principle object of the present invention is to provide a power pack in which any one of a number of power output functions may be selectively derived from cams of individually tailored design which are carried on a single cyclically operable power shaft and for cooperation with which cam followers are individually selectable for power operation thereby.

Other objects and advantages of the present invention will become apparent from the following description of a preferred embodiment thereof and from the accompanying drawing.

DESCRIPTION OF THE DRAWING

FIG. 2 is an exploded view of a portion of a wrap spring clutch assembly shown in FIG. 1 taken from the back relative to FIG. 1.

FIG. 3 is a side view of a portion of the power pack illustrated in FIG. 1.

FIGS. 4—7 are elevational views illustrating in a step by step manner the operation of the portion of the power pack illustrated in FIG. 3.

FIG. 8 is an operative elevational view illustrating the key lever in FIG. 1 to a second operated position to obtain a repetitive power output.

DESCRIPTION OF A PREFERRED EMBODIMENT OF THE INVENTION

Figure 1:
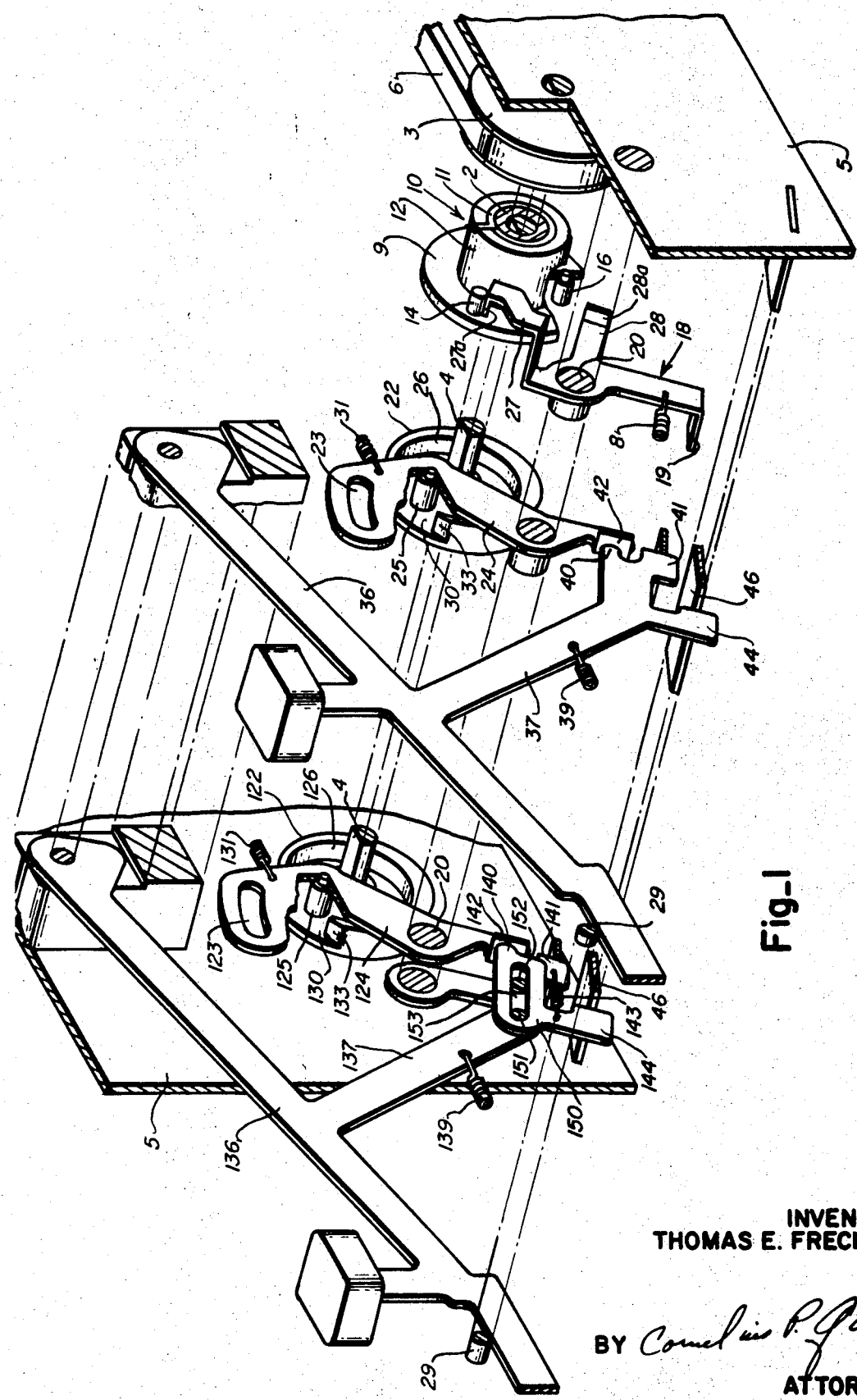
FIG. 1 is a perspective view of a preferred embodiment of the power pack of the present invention.

Referring to the drawing, as illustrated in FIG. 1, a belt 6 connected to the output shaft of an electric motor rotatably drives a pulley 3 having a hollow power rotor 2 extending therefrom supported coaxially on a D-shaped shaft 4 suitably journaled in a pair of side frame members 5.

A conventional wrap spring clutch assembly 10 is mounted in coaxial relationship with the power rotor 2 to couple the power rotor 2 and the D-shaped shaft 4 together in driving engagement.

As illustrated in FIG. 2 showing a view from the rear, the wrap spring clutch assembly 10 includes a hub 12 having an outer flange 9 extending therefrom, and a wrap spring 11 positioned within the hub 12 and telescoped over the power rotor 2. An end 13 of the wrap spring 11 is keyed to a slot 15 in a member 17 rigidly connected to the D-shaped shaft 4 while the end 7 of the wrap spring 11 is keyed to a slot 55 in the outer hub 12 which is turnable with respect to the rotor 2.

A clutch trip bail 18 pivotally mounted on a shaft 20 supported by the frame members 5, has an L-shaped portion 19, and a pair of arms 27 and 28 having bent out ears 27a and 28a respectively. The bent out ears 27a and 28a are adapted to engage and provide a stop for a primary lug 14 and a secondary lug 16 respectively, formed on opposite sides of the flange 9. A spring 8 connected to the frame biases the clutch trip bail 18 clockwise to a normal position in which the ear 27a provides a stop for lug 14, as illustrated in FIG. 1, thereby maintaining the clutch normally disengaged.

In FIG. 1, two exemplary cams 22 and 122, of many are illustrated, each having an external peripheral profile or cam rise adapted to produce a desired tailored power output is shown. These cams 22, 122 are rigidly mounted on the D-shaped shaft 4, and two respectively associated cam followers 24 and 124 or actuatable means are rockably mounted on the shaft 20 and are biased clockwise by springs 31 and 131 respectively. Both of the cams are identical in all respects but for a probable difference in their peripheral profiles. The cam followers related thereto are identical. For brevity, the following description of the cam 22 and related parts applies similarly to cam 122 and related parts if there is read into the given members a prefix 1.

An annular groove 26 forming a peripheral annulus or rim in a face of the cam 22 is provided for receiving a follower pin 25 extending from the actuatable cam follower 24. The peripheral annulus or rim formed by the annular groove 26 has an aperture 30 forming a passageway for the follower pin 25 from the annular groove 26 to the peripheral surface from which the cam 22 rises. In order to enhance movement of the guide pin 25 through the aperture 30 or passage, portions 33 of the peripheral surface of cam 22 adjacent the aperture 30 is beveled as more clearly shown in FIGS. 3—7 and in FIG. 8.

A key lever 36, pivotally mounted on the frame and biased in a clockwise direction against a stop bar 29 by a spring 39, is operative upon counterclockwise depression to rock the actuatable member or cam follower 24 associated with cam 22 from an inoperative position in which the follower pin 25 is positioned in the annular groove 26, to an operative position in which the follower pin 25 is adapted to follow the peripheral surface of the cam 22. Similarly, a key lever 136 pivotally mounted on the frame and biased on a clockwise direction against the stop bar 29 by a spring 139 is operative upon counterclockwise depression to rock the cam follower 124 associated with cam 122 from an inoperative position in which the follower pin 125 is positioned in the annular groove 126, to an operative position in which the guide pin 125 follows the peripheral surface of the cam 122.

A rearwardly protruding nose 40 formed on a depending arm 37 of key lever 36 engages a bent off ear 42 on a tail portion of cam follower 24 while another nose 41 extending from depending arm 37 engages the clutch trip bail 18. A downward projection 44 formed with depending arm 37, limits depression of the key lever 36 by abutting a stationary stop bar 46 after key lever 36 has been depressed a predetermined distance.

In instances where a key is also to be used for instituting repetitive power operations, see FIG. 1 at left, there is provided instead of a key lever 36 and a downward projection thereon, a key lever 136 with a depending arm 136a that carries a slidable member 150 having a rearwardly projecting nose 140 for engaging a bent off nose 142 of the tail portion of the cam follower 124. Additionally, the member 150 has a downward projection 144 which is interceptable by the stop bar 46 during the depression of the key lever 36 after the nose 142 of the cam follower 124 has moved the follower pin 125 through the passage 130 to become operated by the rise of the cam 122. The member 150 has a slot 153 for slidably mounting it on a pair of rivets 151, 152 carried on the depending arm 137 of the key lever 136 and is biased on the latter by a spring 143 to occupy normally the rearwardly projected position seen in FIG. 1. A nose 141 directly on the key lever arm 137 rests normally against the clutch trip bail 18. If the key lever 136 is operated with light pressure, it will become stopped as the downward projection 144 on the slide member meets the stop bar 46, the key pressure being insufficient to extend the spring 143. If so operated by light pressure the key lever 136 will function the same way as the key lever 36. On the other hand, by greater applied pressure, the operation of the key 136 is extendable to a second position against the urge of the spring 143 to operate the clutch trip bail 18 to a control position for causing repeated cyclic turns of the cam shaft 4, as will be evident later herein. With belt 6 rotating the power rotor 2 about the D-shaped shaft 4, selective power output via the follower 25, 125 is obtained by selectively depressing any one of the key levers 36, 136.

By depressing key lever 36, the nose 41 extending from the depending arm 37 of the key lever moved the clutch trip bail 18 counterclockwise from the FIG. 3 position a sufficient distance to remove the ear 27a of stop arm 27 from the path of lug 14 as shown in FIG. 5, releasing hub 12 for rotation, thereby allowing the wrap spring 11 to wrap left to right as viewed in FIG. 2 about the power rotor 2 to enable it to drive the D-shaped shaft 4.

Simultaneously, with the movement of the clutch trip bail 18, the rearwardly extending nose 40 on the depending arm 37 of the key 36 engages the bent off lug 42 of the cam follower 24 and rocks such follower 24 counterclockwise about shaft 20 against the action of the spring 31, raising the follower pin 25 through aperture 30 as illustrated in FIG. 4.

The movement of the clutch trip bail 18 counterclockwise is sufficient to remove the ear 27a of stop arm 27 from the path of lug 14 and to place the ear 28a of the stop arm 28 into the path of the lug 16 as illustrated in FIGS. 4, 7. This merely assures that if the key 36 is not quickly released, there can be no second cyclic rotation of the cam shaft 4.

After the key lever 36 is depressed to a position illustrated in FIG. 4, or depressed further until the downward projection 44 on its depending arm 37 abuts the stop bar 46, the cam follower 24 raises slightly as shown in FIG. 5. Just as soon as the cyclic revolution of the cam commences, the pin 25 of the cam follower 24 will be contacted by the rim embodying the cam 22 so that later the rise of the cam, as shown in FIG. 6, will displace the follower through a predetermined work stroke. If the key lever 36 is held longer than a moment in depressed position, the lug 16 will become intercepted by the ear 28a of arm 28 as shown in FIG. 7, and the wrap spring 11 will disengage from the power rotor 2 and the cyclic rotation of the D-shaped shaft 4 will be temporarily interrupted.

When the key lever 36 is released, the spring 39 returns the key lever 36 clockwise to the normal stop 29 allowing the clutch trip bail 18 to return clockwise under the action of the spring 8, and the ear 42 follows the returning nose 40 to a normal position. The clockwise movement of the clutch trip bail 18 moves the ear 28a of arm 28 out of the path of lug 16 and the ear 27a of arm 27 into the path of lug 14. As a consequence the wrap spring 11 drives the D-shaped shaft 4 the remainder of the cyclic turn and incidental thereto the lug 14 comes into abutment with the ear 27a of the arm 27 to terminate the cyclic revolution. If the key 36 is operated momentarily the wrap spring 11 engages the power rotor 2 with the D-shaped shaft 4 for a complete revolution which is terminated when the lug 14 comes into abutment with the ear 27a of the arm 27. Each time the cam 22 completes a cyclic revolution the aperture 30 becomes positioned opposite the follower pin 25 and such pin 25, under the action of spring 31 is returned through the aperture 30 into the groove 26.

While the follower pin 25 is in contact with the peripheral cam rise of the cam 22, the rotation of the cam 22 drives the cam follower 24 through a programmed movement. The motion of the cam follower 24 may be transmitted through linkages connected to a slot 23 in the cam follower 24, or by any other desired means which may be connected to the cam follower to transmit the effect of the movement of the cam follower 24 to produce desired work.

As shown in FIG. 8, in instances where repetitive power output is desired, a key lever as the one numbered 136 is provided. Upon the depression of such key lever the member 150 with its downward projection 144 moves first unitarily with the depending arm 137 due to the spring 143. As the key 136 reaches the before stated first operated position, the member becomes arrested by the stop bar 46. Upon forced further movement to the second position, seen in FIG. 8, the spring is idly stretched until the rivet 152 limitedly strikes the rear end of slot 153. With the key lever 136 in such a position, the ear 27a has not only been moved out of the path of lug 14, but also the ear 28a of arm 28 has been moved out of the path of lug 16 allowing the wrap spring clutch 11 to remain engaged and continue to rotate the D-shaft 4 and the cams coupled thereto for as long as the key lever is depressed to the second stop position. Furthermore, while the key 136 is held in said second position, the nose 140, through the ear 142 obstructs the follower 124, so that the follower pin 125 is prevented from returning across the passage 130 to its normal position and consequently the cam follower 124 will receive repeatedly power operations by the cam rise of the cam 122 which will be transmitted through a linkage, not shown, connected to a slot 123 in the cam follower, or by other means which may be connected to such follower to produce desired work.

Normally all cam follower pins 25, 125 are respectively in their annular grooves 26 and 126 of the cams 22, 122 and a motion output by any follower 24 or 124 may only be instituted by any key 36, 136 when such cams are in their cyclic home position, that is when the apertures 30 are in alignment with their related follower pins 25, 125. Therefor, while a cyclic turn is in progress, it is impossible to depress any key 36, 136. To prevent depression of more than one key while the cams are in their cyclic home position, the keys 36, 136 obviously may have any known and suitable cross lock mechanism associated therewith.

While only two power output cams and cam followers have been shown in the drawings, it is obvious that a plurality of output cams of the same or various configurations and associated cam followers, can be used to produce any number of power output functions desired without increasing the starting torque requirements of the power source.

The cams 21, 122 may be said to comprise disks which have a pair of oppositely facing faces across which there is a passage 30, and that one of such faces has a cam rise to actuate a cam follower element 25, 125 on an actuatable means or follower 24, 124. The other of such faces is concentric with the cam supporting shaft 4, that is, it is devoid of a cam rise or plain. Each such concentric or plain face obstructs the follower element 25, 125 related to it, except when the cam disks or cams 22, 122 are in cyclic home position.

I claim:
1. A power pack comprising:
a power rotor;
a normally stationary shaft;
cam means on said shaft rotatable therewith and having a peripheral rim provided with a radial passage, said rim having an inner and an outer face, one such face being concentric with said shaft and the other including a cam rise thereon;
a normally disabled clutch means to connect said rotatable shaft and thus said cam means to said rotor for executing cyclic rotations therewith from a home position;
an actuatable means having a cam follower element normally facing said passage from a position clear of and facing toward the path of rotation of said concentric face and being movable from such position across said passage into a position to be then ready to receive a power displacement by said cam rise as said cam means is rotated, such power displacement of the follower element being additive to said movement across said passage;
an operable control element; and
means responsive to the operation of said control element to move said cam follower element across the said passage into the path of operation of said cam rise of said other face and additionally responsive to enable said clutch means to cause a cyclic rotation of said shaft and cam means while such shaft and cam means are stationary.

2. A power pack comprising:
a power rotor;
a normally stationary rotatable shaft;
a cam disk on said shaft rotatable therewith and having a pair of oppositely facing faces across which there is a local passage and one of which faces has a cam rise and the other of which is plain;
a normally disabled clutch means to connect said rotatable shaft, and thus said cam disk, to said rotor for executing a cyclic rotation therewith from a home position;
an actuatable means having a cam follower element which in the cyclic home position of said cam disk faces said passage clear of the operating path of said plain face and facing toward the latter, but which follower element is movable across the operating path of said plain face and said passage into a position to be then ready to receive a power displacement by said cam rise during a cyclic rotation of said cam disk, such power displacement of said follower element being additive to its movement across said passage;
said plain face being effective to obstruct said cam follower element against movement across said passage except when said cam disk is in said cyclic home position;
an operable control element; and
means responsive to the operation of said control element to move said cam follower element across the said passage into the path of operation of said cam rise and additionally responsive to enable said clutch means to cause a cyclic rotation of said rotatable shaft and cam disk while said shaft and cam disk is stationary.

3. A power pack comprising:
a power rotor;
a normally stationary but rotatable shaft;
a plurality of cam disks on said shaft rotatable therewith and having each a pair of oppositely facing faces across which there is a local passage, one of the faces on each cam disk having a cam rise and the other being plain;
a normally disabled clutch means to connect said rotatable shaft, and thus said cam disks, to said power rotor for executing a cyclic rotation from a home position;
an actuatable means related to each cam disk and having each a cam follower element which in the cyclic home position of its related cam disk faces the passage thereof clear of the operating path of said plain face, but is movable across such passage into a position to receive a power displacement by the cam rise during a cyclic rotation of said cam disks;
said plain face being effective to obstruct said cam follower element against movement across said passage except when said cam disk is in said cyclic home position;
an operable control element for each one of said actuatable means and related cam follower element;
means responsive to the operation of any of said control elements to move its related cam follower element across the passage of its related disk into the range of operation of the related cam rise; and
further means responsive to the operation of any control element to cause a cyclic rotation of said shaft, whereby incident to each cyclic rotation of said shaft such cam follower element, as has been moved across a stated passage becomes operated by the cam rise of its related disk, and all the other follower elements become obstructed against movement by the stated plain faces individually related thereto.

4. A power pack as in claim 3, wherein said control elements are operable keys and wherein such of said follower elements as become obstructed against movement by said plain faces render their related keys obstructed.

5. A power pack as in claim 3, wherein the local passages on all the cam disks are in alignment parallel to said shaft.

6. A power pack as in claim 3, wherein said means which is further responsive to the operation of any control elements includes a universal member operable by any control element to exert control over said clutch means.

7. A power pack comprising:
a power rotor;
a rotatable shaft;
a cam disk on said shaft rotatable therewith and having a pair of oppositely facing faces across which there is a local passage and one of which faces has a cam rise and the other of which is plain;
a normally disabled clutch means to connect said rotatable shaft, and thus said cam disk, to said rotor for executing a cyclic rotation therewith from a cyclic home position;
an actuatable means having a cam follower element which in the cyclic home position of said cam disk faces said passage clear of the operating path of said plain face but is movable across said passage into a position to receive a power displacement by said cam rise during a cyclic rotation of said rotatable shaft;
said plain face being effective to obstruct said cam follower element against movement across said passage except when said cam disk is in said cyclic home position;
a key operable from a normal to a first operated position and also to a second operated position;
means responsive to the operation of said key either to said first operated position or said second operated position to move said cam follower element across said passage an equal distance into the path of operation of said cam rise; and
additional means responsive to the operation of said key to said first position and its restoration to cause a single cyclic rotation of said rotatable shaft and said cam disk, and responsive to the operation of said key to said second position to cause continuously cyclic rotations of said rotatable shaft and cam disk until said key is restored.

8. A power pack as recited in claim 7, said responsive means including an element resiliently operable by said key to a limit position to move said cam follower element into the position to receive said power displacement.